May 23, 1967    G. BIRKHOLTZ    3,320,802
DEVICE FOR MEASURING FORCE
Filed Sept. 3, 1964    2 Sheets-Sheet 1
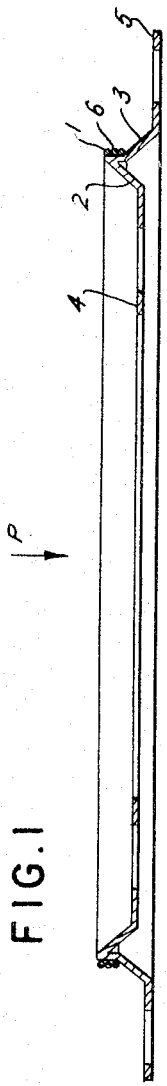
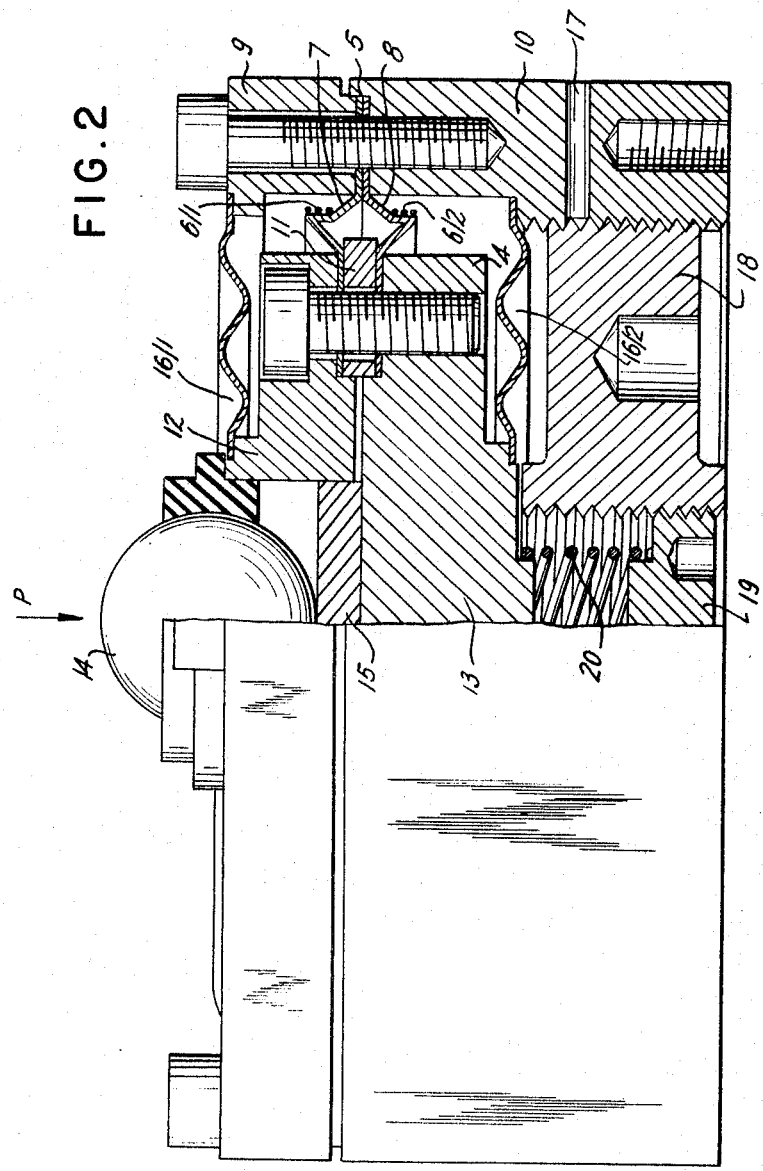

May 23, 1967     G. BIRKHOLTZ     3,320,802
DEVICE FOR MEASURING FORCE

Filed Sept. 3, 1964     2 Sheets-Sheet 2

United States Patent Office 3,320,802
Patented May 23, 1967

3,320,802
DEVICE FOR MEASURING FORCE
Gottfried Birkholtz, Weiterstadt, Germany, assignor to Carl Schenck Maschinenfabrik GmbH, Darmstadt, Germany, a corporation of Germany
Filed Sept. 3, 1964, Ser. No. 394,248
Claims priority, application Germany, Sept. 5, 1963, Sch 33,830
13 Claims. (Cl. 73—141)

My invention relates to a device for measuring force by means of a rotationally symmetrical, elastically deformable gage member consisting of a hollow body whose center axis extends in the direction of the force to be measured and which is axially subjected to the force applied.

In such devices, the deformation of the gage member is taken as a measure of the applied force. For this purpose the deformable gage member is provided with resistance windings, strain gage strips, piezoresistive semiconductor members or other sensors in which an electrically conducting material changes its conductivity with changes in stress produced by the force-responsive deformation. In most cases, two or an even multiple of such sensors are used and are so mounted on the gage member that the force-responsive deformation causes elongation of one sensor or group of sensors while simultaneously shortening the other sensor or group of sensors. An electrical bridge network is employed for utilizing the deformation-responsive change in electrical resistance, so that the measuring result is available in form of corresponding electrical signals applicable for indicating, recording, controlling, regulating or other purposes.

When using deformable force gages in form of bodies stressed in tension or compression, one of the sensors or sensor groups is responsive to elongation or shortening of the sensor whereas the other sensor or group responds to reduction or increase in thickness of the respective gage members. However, since one and the same force produces a larger change in length than in thickness of the gage member, the resulting unbalance imposed upon the measuring bridge network is not symmetrical. Furthermore, the optimal measuring effect can be utilized only in the direction in which the force is effective but not transversely thereof.

In other known force gage devices, the deformable gage members are subjected to bending deformation. This affords mounting the gage members or sensors at respective localities of equal deformation so that the optimum of the force-responsive effect can be utilized. Such devices, however, involve difficulties with respect to uniform heat distribution not only relative to inherent heating but also relative to extraneous thermal influence. These difficulties result in part from the differently long heat-conductance paths to the individual gage members, depending upon the particular construction of the force gage device, and are also due, in part, to non-uniform mass distribution above and below the so-called "neutral fiber." That is, a deformable structure subjected to bending is partly compressed and partly expanded, and the "neutral fiber" is located between these two regions and is subjected neither to compression nor to expansion. When the force is applied to a deformable gage member outside of the "neutral fiber," the known devices exhibit the further disadvantage that the measuring effect in the compression region does not have the same amount as that in the expansion region. This results in a non-linear course of the measuring characteristic. Since the known devices do not permit maintaining the application of force in the "neutral fiber" throughout the entire measuring range, a linear characteristic cannot be attained. It is rather necessary to resort to a greater or lesser amount of design features and remedial expedients in order to provide for an approximation to the ideal linear characteristic by aiming at a characteristic which fluctuates sinusoidally about the linear course.

It is an object of my invention to devise a force gage device which avoids the above-mentioned disadvantages and shortcomings of the known devices.

More specifically, it is an object of the invention to provide a force gage which has a symmetrical construction and thereby secures a uniform heat distribution as well as a uniform deformation throughout the entire deformable gage member, thus affording a utilization of the optimal measuring effect.

Another object is to provide a force gage having a continuous and linear measuring characteristic.

Still another object of the invention is to considerably increase the measuring output of such force gages.

According to the invention, the force gage device is provided with a gage member formed of a hollow body which has preferably rotationally symmetrical force input structures at both axial ends respectively, these structures extending away from the hollow gage member proper at mutually opposed angles of inclination relative to the axis of the member, one of the end structures being located inside and the other outside of the geometric space or its imaginary extension defined by the gage member. The two end structures of the gage member are further provided with force-receiving extremities of which at least one is displaceably guided for movement in the axial direction of the gage member proper. The gage member preferably consists of a circular ring whose axial height is short in comparison with the diameter and which carries the above mentioned electrical transducer means for providing an electrical voltage in response to deformation of the ring.

When a gage according to the invention is subjected to force to be measured, the gage member is subjected to uniform deformation so that it exhibits the same increase or decrease in diameter on its entire height. The sensor or transducer means mounted on the wall of the hollow gage member thus are all subjected to the same deformation and consequently can all be operated simultaneously in the optimal range of deformation.

The above-mentioned and further objects, advantages and features of the invention will be apparent from, and will be described in, the following with reference to embodiments of force gage devices according to the invention illustrated by way of example on the accompanying drawings.

FIG. 1 is a diametrical section through a gage member.

FIG. 2 is a partly sectional view of the force gage comprising two symmetrically mounted gage members according to FIG. 1.

Figure 4:
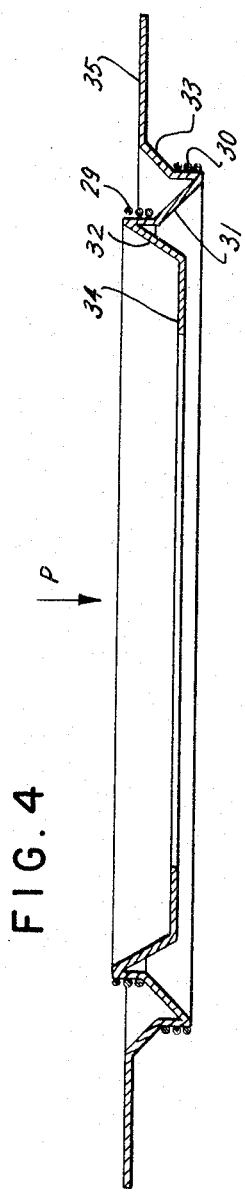
FIG. 4 is a diametrical section through two coaxial gage members merged with each other to form a mechanical series arrangement.

The elastically deformable gage member according to FIG. 1 comprises an axially short, rotationally-symmetrical hollow body of steel or preferably of copper-beryllium alloy. The hollow body 1 has essentially the shape of a circularly cylindrical ring which is axially very short in comparison with its diameter. The two axial ends of the gage member proper merge with frusto-conical force-transmitting structures 2 and 3. The inclinations of the respective frusto-conical structures are inclined in mutually opposed directions relative to the center axis of the ring. The free ends of the structures 2 and 3 are provided with respective force-receiving clamping flanges 4 and 5. The axially short hollow member 1 carries an electrical resistance winding 6 or other electrical transducer means for providing a voltage in dependence upon deformation of the member. One of the two extremities, for example the outer flange 5, may be clamped in a fixed position, in which case the inner extremity 4 is displaceable in the axial direction under the effect of the force represented by an arrow P. The applied force is transmitted through the frusto-conical transmitting structures 2 and 3 onto the gage member 1 so that the diameter of the member becomes uniformly reduced by parallel displacement of the extremity 4. When the applied force acts in the opposite direction, the diameter of the hollow gage member 1 is increased.

According to another feature of the invention, two deformable gage members are arranged in mirror-symmetrical relation to a plane perpendicular to the direction of the force to be measured and are connected with each other in mechanical parallel relation.

According to another embodiment of the invention, two deformable gage members are connected mechanically in series by having one of the force-transmitting structures of one gage member merge with one of the force-transmitting structures of the other gage member without a change in direction. In such a series connection, the two gages have respectively different diameters, and the outer force-transmitting structure of the inner gage member is merged in the manner described with the inner force-transmitting structure of the outer gage member.

In each such twin arrangement, regardless of whether a parallel or series operation of the gage members is involved, one of the gage members is subjected to reduction in diameter while the other increases its diameter. Consequently, the electrical sensors or transducer means mounted on the two gage members may be electrically connected together in a measuring bridge network or push-pull circuit for simultaneously utilizing both effects.

The applied force and the counter force may act directly upon the force-receiving extremities of the gages according to the invention. However, an elastically deformable body may also be interposed between the applied force or the force-input point and the force-receiving extremity. In an embodiment of the latter type, it is preferable, according to another feature of the invention, to have the deformable gage member or members pre-stressed against the interposed elastically deformable body and in opposition to the direction of the applied force. Particularly useful is a pre-stress amounting to approximately one-half of the permissible maximum of the force to be measured, so that when the device is loaded up to one-half of the permissible force maximum, the deformable force gage member is relieved until a mechanical zero point is reached, whereafter a further increase in applied force up to the permissible maximum causes loading of the gage member in the opposite direction. This permits doubling the measuring output which is of advantage for many purposes although to some detriment to exact linearity of the characteristic.

According to further features of the invention, force gage devices according to the invention are equipped with an overload protective structure, further with adjustable and preferably exchangeable spring means acting in opposition to the applied force for calibrating purposes. The supporting or housing structure of the force gage device may be provided with openings for the purpose of securing a uniform pressure on all sides of the deformable force gage members.

A measuring device or gage is said to have a "linear characteristic" if the curve representing the characteristic is a straight line and if the straight characteristic resulting from measurements under load coincides with the characteristic under no-load conditions. Due to hysteresis, such coincidence is normally not obtainable. According to another feature of the invention, therefore, the force gage device is provided with one or more tensioning means with whose aid two mirror-symmetrical, deformable gage members are pre-stressed to an adjustable extent, each by itself or both in opposition to each other. This permits producing in the gage members an internal tension, and adjusting the magnitude of this tension to a desired, smallest feasible hysteresis in the gage members.

It will be understood from the foregoing that it is preferable to provide two force gage members according to FIG. 1 of which one is subjected by the applied force to deformation in the sense of a diameter reduction, while the other gage member is simultaneously deformed to an increased diameter. By electrically connecting the resistance windings, strain gages or other transducers which are mounted on the two gage members, into an electrical measuring circuit, a substantially linear measuring characteristic can thus be obtained.

Such a pairwise arrangement of two ring-shaped gage members is embodied in the device illustrated in FIG. 2. Two elastically deformable gage members 7, 8 of the same design and the same size, each corresponding to the gage member described above with reference to FIG. 1, are arranged in mirror symmetrical relation to a plane perpendicular to the center axis of the gage members which is coincident with the direction of the applied force denoted by an arrow P. The respective outer extremities 5, constituting the mounting flanges of the two gage members, are fixedly clamped between two portions 9 and 10 of a rigid housing structure. The inner, likewise flange-like extremities of the two gage members are spaced from each other by a rigid ring 11 and are firmly joined with a coaxial ring 12 and a pressure piece 13. A steel ball 14 seated in the ring 5 rests against a pressure plate 15 in face-to-face contact with the pressure piece 13.

When a force is applied in the direction of the arrow P, it acts through the ball 14 in plate 15 upon the pressure piece 13. As a result, the frusto-conical force-transmitting structure of the gage member 7 and hence the transducer windings 6/1 are compressed, whereas the frusto-conical transmitting portion of the gage member 8 and the transducer windings 6/2 of the latter member are expanded.

The gage members proper are sealed from the outside by means of flexible diaphragms 16/1 and 16/2. The housing portion 10 is in threaded engagement with a bottom portion 18 and is provided with a lateral bore communicating with the ambient air so that the ambient air pressure, acting through the bore 17 and through the interspaces of the screw thread between parts 10 and 18, acts also upon the outer area of the inner diaphragm 16/2. Consequently, the two force gages 7 and 8 are on all sides subjected to the same atmospheric pressure so that measuring errors due to changes in ambient temperature are eliminated.

The bottom portion 18 constitutes an adjustable closure which, when properly adjusted by being more or less deeply screwed into the housing, functions as an overload protection in conjunction with the pressure plate 13, since the pressure plate 13, in the event the pre-adjusted maximum load is exceeded, enters into direct contact engagement with the bottom portion 18 and thereby prevents destruction of the deformable force gages 7 and 8. Centrally located in the bottom portion 18 is a set screw 19 by means of which an exchangeable helical spring 20 can be pre-stressed. This permits calibrating the device.

Figure 3:
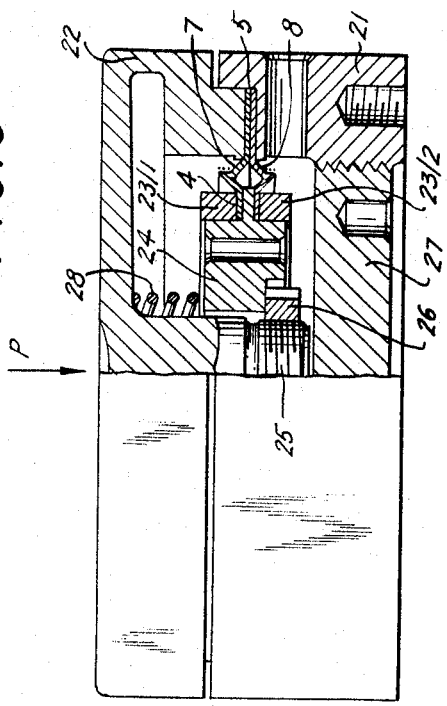
FIG. 3 shows partly in section a force gage device equipped with two symmetrically arranged gage members and with means for jointly pre-stressing the gage members.

In the embodiment shown in FIG. 3, the deformable force gage members 7 and 8, corresponding essentially to FIG. 1, are arranged relative to each other in the same manner as described above with reference to FIG. 2. The flanges which form the outer extremities 5 of the two gage members are firmly joined with the housing 21 of the device by means of a load diaphragm structure 22 joined with the housing 21 by a shrink fit. The flanges 4 which constitute the respective inner extremities of the two gage members 7 and 8 are firmly connected with a pressure piece 24 by shrink-fitted rings 23/1 and 23/2. The diaphragm structure 22 carries in its center a threaded bolt 25 engaged by a nut 26 which is connected with the pressure piece 24. By tightening or loosening the nut 26 on the bolt 25, the two gage members 7 and 8 can be pre-tensioned in opposition to the direction of the applied force against a helical spring 28 seated between the pressure piece 24 and the diaphragm structure 22. An adjustable bottom 27, in threaded engagement with the housing 21, closes the device and also serves in the manner described with reference to FIG. 2 as an overload protection device in coaction with the bolt 25 which abuts against the properly adjusted bottom 27 when a given overload limit is reached, thus preventing the force gage members from being damaged.

The degree of deformation to which the annular force gages are subjected can be adjusted within wide limits by correspondingly selecting the effective diametrical length of the load diaphragm structure 22 and the inclination angles of the force-transmitting structures which form part of the gage members 7 and 8. By thus properly selecting a suitable transmission ratio, the output for a given stress applied to the material of the rotationally symmetrical gage members is doubled if the pre-tension in opposition to the applied force is set to one-half of the permissible force maximum. When the load diaphragm structure 22 is loaded by the applied force, represented by an arrow P, the deformable gage members 7 and 8 are first relieved of the pre-stress until the mechanical zero point, namely a stress-free condition, is reached, whereafter a further increase of the load applied to the structure 22 has the effect of stressing the force gages through the elastic member 28. This involves a loss with respect to linearity of the characteristic but, on the other hand, has the advantage of achieving an output of twice the amount in comparison with a not pre-tensioned device, such increase in output being sometimes more desirable.

In the embodiment shown in FIG. 4, two deformable force gage members according to the invention are mechanically joined in series by combining the mutually adjacent force transmitting structures of two short cylindrical members 29 and 30 of respectively different diameters, so that these two structures form a single force transmitting portion 31 of straight frusto-conical configuration. The other force-transmitting structures 32 and 33 of the respective annular members 29 and 30 are provided with clamping flanges 34 and 35 which constitute respective extremities of the resulting combination gage. When the outer flange 35 is stationarily clamped and the inner flange 34 is subjected to load by the applied force in the direction of the arrow P, the diameter of the gage member 29 is reduced uniformly over the entire axial height of the member, and the diameter of gage member 30 is increased uniformly over the axial height of the latter member.

Figure 5:
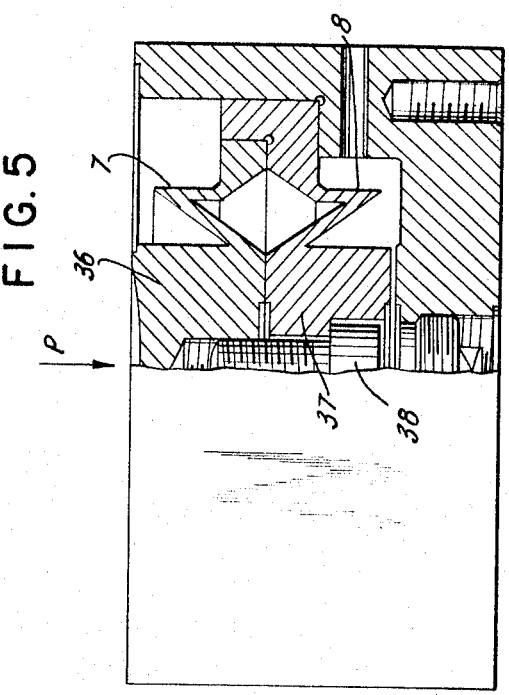
FIG. 5 shows partly and in section a force gage device with two symmetrically arranged gage members and adjustable means for producing an internal pre-stress in the gage members.

The embodiment according to FIG. 5 is provided with substantially the same mirror-symmetrical arrangement of the deformable gage member 7, 8 as the embodiment shown in FIG. 2. However, in lieu of the clamping flanges 4, 5 which constitute the force-receiving extremities of the gage members according to FIG. 2, the corresponding gage members 7 and 8 in the device shown in FIG. 5 are provided with compact and rigid bodies 36 and 37 respectively, which constitute the force-receiving extremities. The bodies 36 and 37 are pre-stressed against each other by adjusting means which in the illustrated example are constituted by a pressure screw 38. By tightening the screw bolt 38, the two gage members 7 and 8 are forced against each other to the extent at which they possess the desired, preferably smallest feasible hysteresis.

In embodiments of force gage devices according to the invention which, as exemplified by FIGS. 2 to 5, are provided with pairwise arranged deformable gage members, a uniform deformation of the gage member which, under the applied force, reduces its diameter and of the gage member which simultaneously increases its diameter, can be obtained. This offers the advantage that the electrical bridge network connected to the transducers of the gage members will operate symmetrically and thus afford a high zero-point stability. Furthermore, the application of force can be readily directed to the localities of optimal deformation so as to result in a continuous measuring curve, and irregularities due to deformation of material at the clamping or force-receiving localities are avoided.

To those skilled in the art, it will be obvious upon a study of this disclosure that my invention permits of a great variety of modifications and can be given embodiments other than particularly illustrated and described herein, without departing from the essential features of my invention and within the scope of the claims annexed hereto.

I claim:

1. In a force gage, a rotationally symmetrical hollow gage member of material elastically deformable by an applied force to be measured and having a center axis in the direction of the applied force, said gage member being provided at both axial ends with respective force-transmitting structures extending away from said member with mutually opposed inclinations relative to said axis, one of said structures being inside and the other outside of the geometric space defined by said gage member, said two structures having respective force-receiving extremities of which at least one is displaceable in said axial direction, the applied force to be measured being transmitted through said force-transmitting structures to said gage member to change the diameter thereof, the resulting change in the diameter of said gage member being proportional to the magnitude of said applied force.

2. In a force gage according to claim 1, a structure elastically deformable in the direction of the applied force operatively engaging said displaceable extremity for applying thereto the force to be measured.

3. In a force gage according to claim 1, supporting means on which said deformable gage member is mounted, a structure elastically deformable in the direction of the applied force operatively engaging said displaceable extremity for applying thereto the force to be measured, and pre-stressing means mounted on said supporting means for applying to said gage member a bias force against said elastically deformable structure and in a direction opposed to that of the force to be measured.

4. In a force gage according to claim 1, supporting means on which said deformable gage member is mounted, and a rigid abutment on said structure for limiting the force-responsive displacement of said member to protect it from overload.

5. In a force gage according to claim 1, supporting means on which said deformable gage member is mounted, and adjustable calibrating means mounted on said supporting means and comprising a spring operatively engaging said displaceable extremity for applying thereto the force to be measured, said spring having relative to said gage member a selective spring force opposed to the force to be measured.

6. In a force gage according to claim 1, said gage member consisting of copper-beryllium alloy.

7. In a force gage, an elastically deformable gage member of annular shape having short axial length relative to its diameter and having its axis extend in the direction of an applied force to be measured, two rotationally symmetrical force-transmitting structures peripherally joined with said member at the respective axial ends thereof and being substantially of hollow frusto-conical shapes having respective mutually opposed inclinations relative to said axis, one of said structures being inside and the other outside of the geometric space defined by said annular member, said two structures having respective force-receiving extremities of which at least one is displaceable in said axial direction, the applied force to be measured being transmitted through said force-transmitting structures to said gage member to change the diameter thereof, the resulting change in the diameter of said gage member being proportional to the magnitude of said applied force.

8. In a force gage, supporting means having a central axis extending in the direction of an applied force to be measured, two elastically deformable rotationally symmetrical hollow gage members disposed on said supporting means in mirror-symmetrical relation to a plane perpendicular to said axis, each of said members being provided at both axial ends with respective force-transmitting structures extending away from said member with mutually opposed inclinations relative to said axis, one of said structures being inside and the other outside of the geometric space defined by said gage member, said two structures having respective force-receiving extremities of which at least one is displaceable in said axial direction and joined with one of said extremities of said other deformable member, and at least one of the remaining extremities being rigidly fastened to said supporting means, whereby both said deformable bodies are jointly operated, the applied force to be measured being transmitted through said force-transmitting structures to said gage members to change the diameters thereof, the resulting changes in the diameters of said gage members being proportional to the magnitude of said applied force.

9. In a force gage according to claim 8, the inner one of said extremities of one of said deformable bodies being joined with the outer extremity of the other member, one of the remaining two extremities being rigidly fastened to said supporting means and the fourth extremity being displaceable in said axial direction by force to be measured, whereby said two deformable members operate in mechanical series relation.

10. In a force gage according to claim 8, adjustable pre-stressing means operatively engaging said displaceable extremity and said supporting means for tensioning said gage members in a direction opposed to that effected by the force to be measured.

11. In a force gage, two elastically deformable coaxial gage members of annular shape and respectively different diameters each having a short axial length relative to its diameter and having its axis extend in the direction of an applied force to be measured, two rotationally symmetrical force-transmitting structures peripherally joined with each of said annular members at the respective axial ends thereof and being substantially of hollow frusto-conical shapes having respective mutually opposed inclinations relative to said axis, one of said structures being inside and the other outside of the geometric space defined by said annular member, said outer structure of said smaller-diameter member merging without directional change with said inner structure of said larger-diameter member, and said remaining two structures having respective extremities of which one is displaceable in said axial direction, the applied force to be measured being transmitted through said force-transmitting structures to said gage members to change the diameters thereof, the resulting changes in the diameters of said gage members being proportional to the magnitude of said applied force.

12. In a force gage, supporting means having a central axis extending in the direction of an applied force to be measured, two elastically deformable rotationally symmetrical hollow gage members disposed on said supporting means in mirror-symmetrical relation to a plane perpendicular to said axis, each of said members being provided at both axial ends with respective force-transmitting structures extending away from said member with mutually opposed inclinations relative to said axis, one of said structures being inside and the other outside of the geometric space defined by said gage member, said two structures having respective force-receiving extremities of which one is rigidly fastened to said supporting means and the other is displaceable in the direction of said force axis, said other extremities of said respective two members being rigidly joined with each other whereby said two deformable members operate in mechanical parallel relation, the applied force to be measured being transmitted through said force-transmitting structures to said gage members to change the diameters thereof, the resulting changes in the diameters of said gage members being proportional to the magnitude of said applied force.

13. In a force gage, a hollow housing structure, an elastically deformable gage member mounted in said housing structure so as to divide said housing structure into two closed chambers on opposite sides of said gage member and having its axis extend in the direction of an applied force to be measured, two rotationally symmetrical force-transmitting structures peripherally joined with said member at the respective axial ends thereof and being substantially of hollow frusto-conical shapes having respective mutually opposed inclinations relative to said axis, one of said structures being inside and the other outside of the geometric space defined by said annular member, said two structures having respective force-receiving extremities of which one is secured to said housing structure and the other is displaceable in said axial direction, said housing structure having openings for equalizing the air pressures on the opposite sides of said gage member, the applied force to be measured being transmitted through said force-transmitting structures to said gage member to change the diameter thereof, the resulting change in the diameter of said gage member being proportional to the magnitude of said applied force.

References Cited by the Examiner

UNITED STATES PATENTS 3,036,283   5/1962   Singdale et al. _____ 73—88.5 X
3,199,057   8/1965   Gindes et al. _____ 73—141

OTHER REFERENCES

Birkholtz, German printed application No. 1,135,204, published 8–1962.

Birkholtz, German printed application No. 1,139,668, published 11–1962.

RICHARD C. QUEISSER, *Primary Examiner.*

C. A. RUEHL, *Assistant Examiner.*